May 4, 1926.
J. J. PAWLAS
1,583,166
MANUFACTURE OF CANDY AND CONFECTIONS
Filed March 20, 1922    2 Sheets-Sheet 1
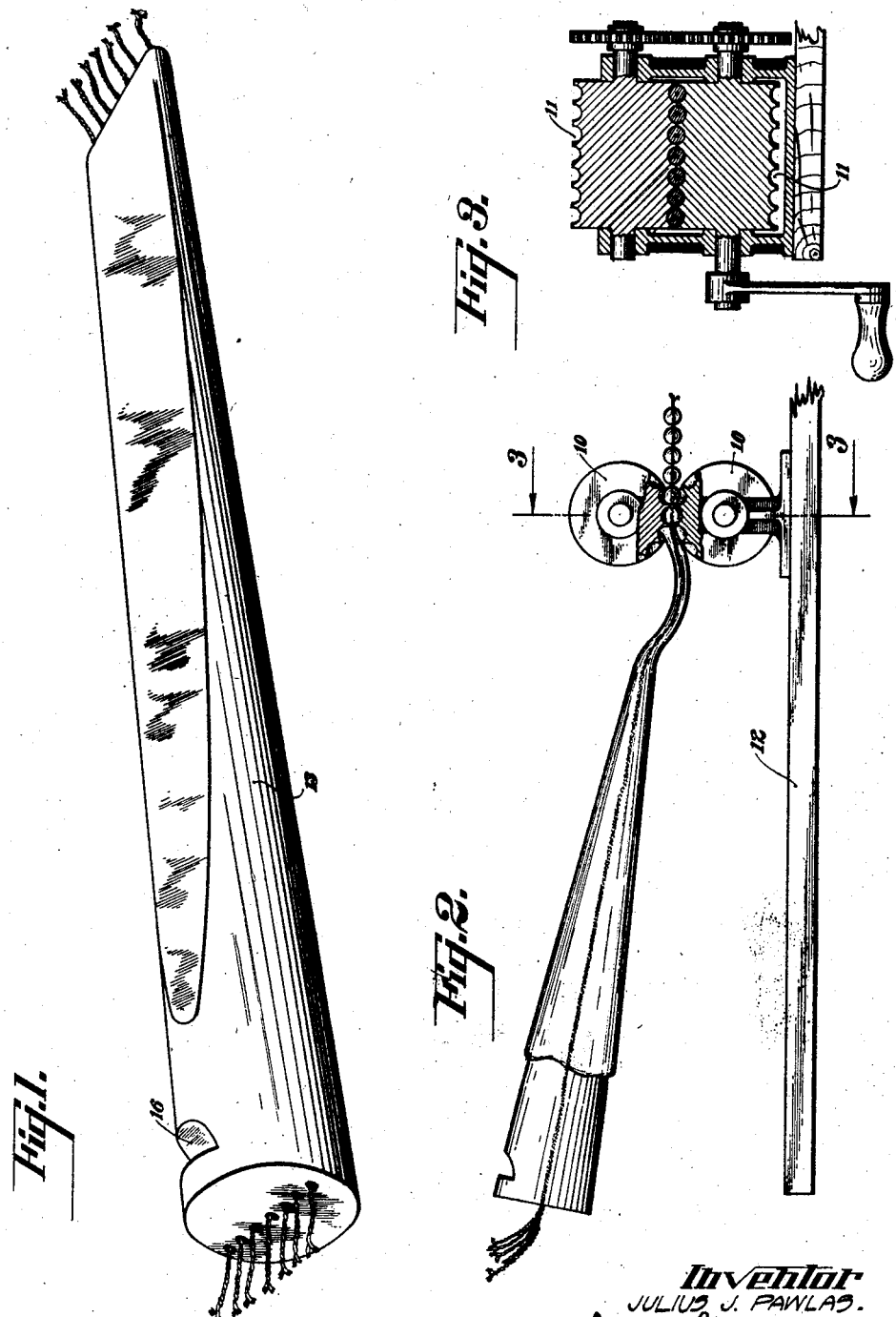
Inventor
JULIUS J. PAWLAS.
By Davies, Strong, Townsend and Loftus
Attorneys

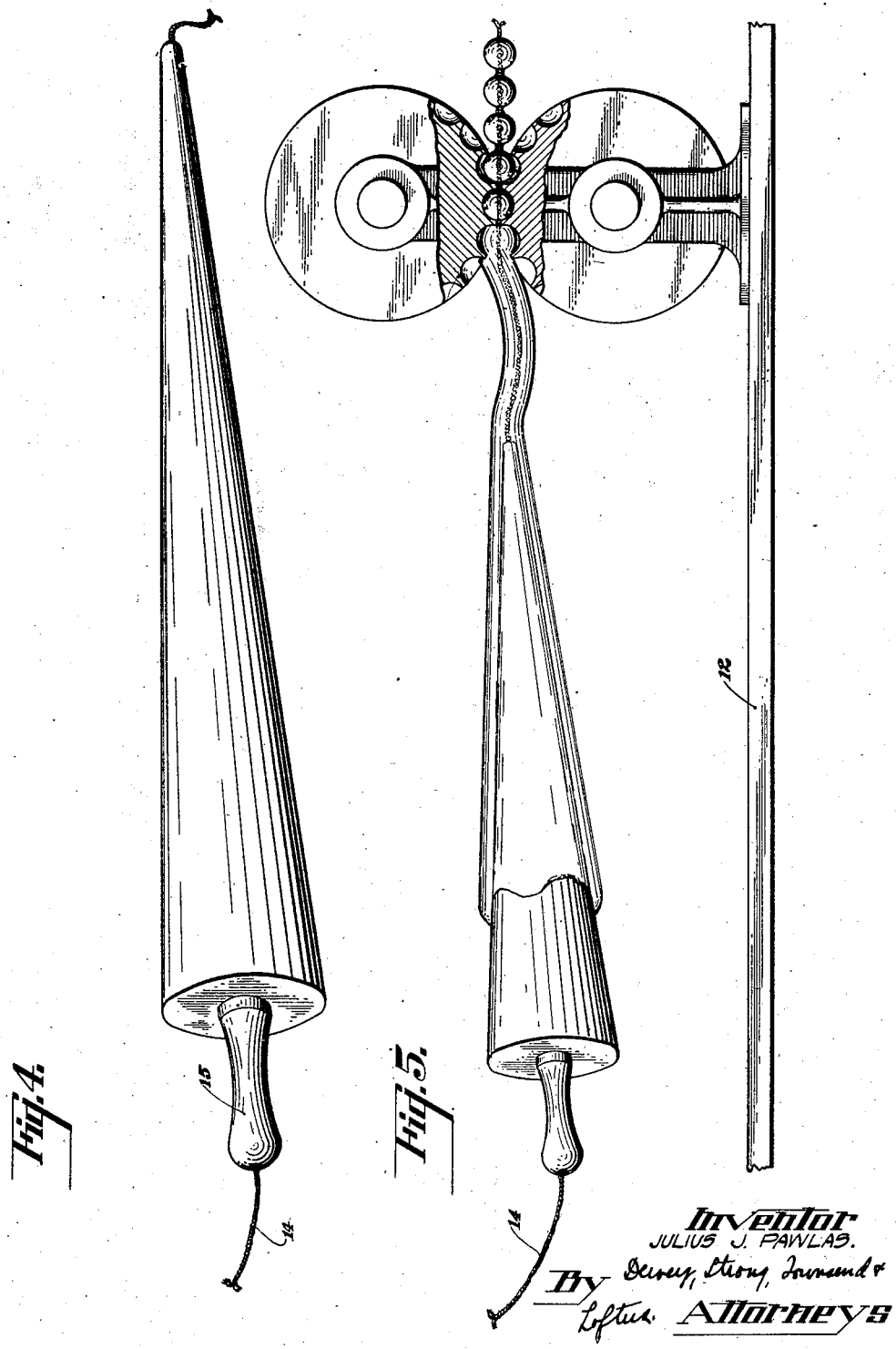

Patented May 4, 1926.

1,583,166

UNITED STATES PATENT OFFICE.

JULIUS J. PAWLAS, OF WATSONVILLE, CALIFORNIA.

MANUFACTURE OF CANDY AND CONFECTIONS.

Application filed March 20, 1922. Serial No. 545,018.

*To all whom it may concern:*

Be it known that I, JULIUS J. PAWLAS, a citizen of the United States, residing at Watsonville, county of Santa Cruz and State of California, have invented new and useful Improvements in the Manufacture of Candy and Confections, of which the following is a specification.

This invention relates to the manufacture of candy or confections, and more particularly to the making of beads or drops of candy.

The object is to form an opening in each bead or drop of candy, so that they may be arranged upon a string in clusters or loops.

In carrying out this object, I prefer to make use of a conventional form of candy machine which is capable of forming drops or beads of candy from a rope or string of plastic material. The rope or strip of candy is worked around a mold before being fed to the machine, and this mold has one or more strings passing longitudinally through its axis so that as the candy comes off the end of the mold the string or strings will be embedded therein in such position that the beads or drops will be formed around the string.

In the accompanying drawings:

Fig. 1 shows a perspective view of a mold having a plurality of strings extending therethrough.

Fig. 2 shows a side elevation of a drop or bead forming machine and a mold in front thereof for feeding a strip of candy thereto with the strings embedded therein.

Fig. 3 shows a sectional view of the machine for forming the drops or beads of candy, taken on the line 3—3 of Fig. 2.

Fig. 4 shows a perspective view of a mold suitable for forming a strip of candy with a single string embedded therein.

Fig. 5 shows a similar view of the mold in connection with a bead or drop forming machine.

In the form of drop or bead forming machine shown herein, there are two rollers 10, each formed with cooperating dies or cups 11, serving to separate and form the candy into drops or beads. The rollers may have one or more series of these dies or cups, depending on the capacity of the machine. Candy is fed thereto in strips or ropes from a molding table 12.

To accomplish the object of my invention, I make use of a special form of mold 13, which is preferably cylindrical at one end and pointed or flattened at the opposite end. Extending longitudinally through this mold are one or more openings, each receiving a string 14.

In practicing my invention a plastic mass of candy is placed upon the table 12 and is worked around the mold by hand, being drawn out over the attenuated end of the mold so that the projecting strings become embedded in the candy. The rope or strip of candy is then fed to the drop or bead forming rollers, with a string in line with each set of cups or dies. The beads or drops, when formed, remain upon the string. They may be left strung in this manner or, if desired, the string can be withdrawn, leaving beads formed with well formed openings, so that they can be strung later or other uses made of the openings therein.

The mold is preferably formed with a centrally arranged handle 15, at the large end where one string is employed, as shown in Figs. 4 and 5. In its other form where several strings are used, I show a notch 16 which forms a grip for the hand. This handle or grip enables the workmen to pull the mold through the mass of candy and draw the latter off in a thin strip surrounding the projecting strings.

Various changes and modifications may be employed in the apparatus above described without departing from the spirit of my invention as disclosed in the appended claim.

Having thus described my invention, what I claim and desire to secure by Letters Patent is—

A mold for use in connection with the making of candy beads or drops with a string passing therethrough, said mold comprising an elongated body, one end of said body being relatively wide as compared to its thickness and substantially wedge-shaped in longitudinal cross-section, the other end of said body being provided with a handle, and a plurality of openings passing longitudinally through said body and through said handle, each of said openings being adapted to hold a string, whereby plastic candy may be worked around the mold and drawn from the wedge-shaped end thereof with the strings spaced along the median line of the candy in readiness to be fed to a forming machine.

JULIUS J. PAWLAS.